United States Patent
Meirav et al.

(10) Patent No.: US 10,046,266 B2
(45) Date of Patent: Aug. 14, 2018

(54) SYSTEMS AND METHODS OF CLEANING CABIN AIR IN A TRANSPORTATION VEHICLE

(71) Applicant: ENVERID SYSTEMS, INC., Houston, TX (US)

(72) Inventors: Udi Meirav, Newton, MA (US); Israel Biran, Avihayil (IL)

(73) Assignee: ENVERID SYSTEMS, INC., Needham, MA (US)

(*) Notice: Subject to any disclaimer, the term of this patent is extended or adjusted under 35 U.S.C. 154(b) by 206 days.

(21) Appl. No.: 14/778,529

(22) PCT Filed: Mar. 18, 2014

(86) PCT No.: PCT/US2014/031009
§ 371 (c)(1),
(2) Date: Sep. 18, 2015

(87) PCT Pub. No.: WO2014/153333
PCT Pub. Date: Sep. 25, 2014

(65) Prior Publication Data
US 2016/0288043 A1    Oct. 6, 2016

Related U.S. Application Data

(60) Provisional application No. 61/802,984, filed on Mar. 18, 2013.

(51) Int. Cl.
*B01D 53/02* (2006.01)
*B01D 53/04* (2006.01)
(Continued)

(52) U.S. Cl.
CPC ..... *B01D 53/0462* (2013.01); *B01D 53/0454* (2013.01); *B01D 53/22* (2013.01);
(Continued)

(58) Field of Classification Search
CPC ........ B01D 2253/102; B01D 2253/104; B01D 2253/106; B01D 2253/108;
(Continued)

(56) References Cited

U.S. PATENT DOCUMENTS 4,530,817 A    7/1985  Holter et al.
5,948,355 A    9/1999  Fujishima et al.
(Continued)

OTHER PUBLICATIONS

International Search Report for International Application No. PCT/US2014/031009, dated Aug. 15, 2014.

*Primary Examiner* — Christopher P Jones
(74) *Attorney, Agent, or Firm* — Cooley LLP (57) ABSTRACT

Methods, systems, and devices for an automotive vehicle air cleaning system are provided which may be configured to operate in at least an adsorption mode and an in-situ regeneration mode are disclosed. The system includes at least one type of sorbent material configured to remove $CO_2$ from a cabin of an automotive vehicle according to a repeated adsorption-desorption swing cycle, a first inlet configured to supply a first airflow of air from the cabin to the system during an adsorption mode, and a first outlet configured to return the first airflow after passing over and/or through the sorbent material during the adsorption mode. The system includes a second inlet configured to supply a second airflow of outside air to the system during a regeneration mode, a second outlet to return the second airflow after passing over and/or through the sorbent material during the regeneration mode.

19 Claims, 4 Drawing Sheets

(51) Int. Cl.
- *B01D 53/62* (2006.01)
- *B01D 53/22* (2006.01)
- *B01D 53/50* (2006.01)
- *B01D 53/56* (2006.01)
- *B01D 53/66* (2006.01)
- *B01D 53/72* (2006.01)
- *B01D 53/92* (2006.01)
- *B01D 53/94* (2006.01)
- *B60H 3/06* (2006.01)

(52) U.S. Cl.
CPC ............ *B01D 53/50* (2013.01); *B01D 53/56* (2013.01); *B01D 53/62* (2013.01); *B01D 53/66* (2013.01); *B01D 53/72* (2013.01); *B01D 53/92* (2013.01); *B01D 53/94* (2013.01); *B60H 3/0633* (2013.01); *B01D 53/0407* (2013.01); *B01D 2253/102* (2013.01); *B01D 2253/104* (2013.01); *B01D 2253/106* (2013.01); *B01D 2253/108* (2013.01); *B01D 2253/11* (2013.01); *B01D 2253/116* (2013.01); *B01D 2253/1124* (2013.01); *B01D 2253/20* (2013.01); *B01D 2253/202* (2013.01); *B01D 2253/204* (2013.01); *B01D 2257/106* (2013.01); *B01D 2257/30* (2013.01); *B01D 2257/302* (2013.01); *B01D 2257/404* (2013.01); *B01D 2257/502* (2013.01); *B01D 2257/504* (2013.01); *B01D 2257/708* (2013.01); *B01D 2257/91* (2013.01); *B01D 2257/93* (2013.01); *B01D 2258/01* (2013.01); *B01D 2258/06* (2013.01); *B01D 2259/40007* (2013.01); *B01D 2259/4009* (2013.01); *B01D 2259/4558* (2013.01); *B01D 2259/4566* (2013.01); *B01D 2259/4575* (2013.01); *B60H 2003/0683* (2013.01); *B60H 2003/0691* (2013.01); *Y02C 10/04* (2013.01); *Y02C 10/08* (2013.01); *Y02C 10/10* (2013.01)

(58) Field of Classification Search
CPC ........ B01D 2253/11; B01D 2253/1124; B01D 2253/116; B01D 2253/20; B01D 2253/202; B01D 2253/204; B01D 2257/106; B01D 2257/30; B01D 2257/302; B01D 2257/404; B01D 2257/502; B01D 2257/504; B01D 2257/708; B01D 2257/91; B01D 2257/93; B01D 2258/01; B01D 2258/06; B01D 2259/40007; B01D 2259/4009; B01D 2259/4558; B01D 2259/4566; B01D 2259/4575; B01D 53/0407; B01D 53/0454; B01D 53/0462; B01D 53/22; B01D 53/50; B01D 53/56; B01D 53/62; B01D 53/66; B01D 53/72; B01D 53/92; B01D 53/94; B60H 2003/0683; B60H 2003/0691; B60H 3/0633; Y02C 10/04; Y02C 10/08; Y02C 10/10

See application file for complete search history.

(56) References Cited

U.S. PATENT DOCUMENTS

| | | |
|---|---|---|
| 6,773,477 B2 | 8/2004 | Lindsay |
| 7,472,554 B2 | 1/2009 | Vosburgh |
| 2002/0056373 A1 | 5/2002 | Fielding |
| 2006/0249019 A1 | 9/2006 | Roychoudhury et al. |
| 2008/0127821 A1 | 6/2008 | Noack et al. |
| 2009/0260372 A1 | 10/2009 | Skinner et al. |

SYSTEMS AND METHODS OF CLEANING CABIN AIR IN A TRANSPORTATION VEHICLE

CROSS-REFERENCE TO RELATED APPLICATIONS

This application is a 35 U.S.C. § 371 national stage entry of PCT/US2014/031009, which claims priority to U.S. Provisional Patent Application No. 61/802,984 filed Mar. 18, 2013, and entitled "Regenerable Air Scrubber for Vehicles," the disclosure of which is incorporated herein by reference in its entirety.

TECHNICAL FIELD

Some embodiments of the present disclosure generally relate to devices and methods for managing air quality in vehicle cabins and particularly to cleaning cabin air in a transportation vehicle.

BACKGROUND

Air quality within vehicles is an important, yet insufficiently addressed, issue. Passenger cars, public transportation vehicles, ships and commercial aircraft all have in common a confined space with high occupant density. Passengers consume oxygen and produce carbon dioxide ($CO_2$) in significant amounts. Therefore $CO_2$ levels tend to rise quickly, unless the air is replaced with relatively large amounts of clean, outside air, introduced into the vehicle.

Replacing the cabin air with outside air presents challenges of its own, both in terms of the cooling power required to condition the inflow of outside air as well as the quality of outside air surrounding the vehicle. The latter is especially true regarding high levels of fumes, smoke and dust that may be present in roadways and cities and including the exhaust emissions of other vehicles.

Most vehicles have systems designed to condition and circulate the air to provide a relatively comfortable environment for the passengers and, perhaps most importantly, the drivers or operating crew. These systems have provisions for replacing the air with outside air from outside the vehicle, while filtering and treating the outside air. However these are not always sufficient to provide good air quality, and face complex tradeoffs associated with the amount of outside air injected into the cabin. For example, most passenger cars allow air recirculation, so as to increase the efficiency of the air conditioner and avoid the introduction of outside fumes and dust.

Despite these provisions, air quality in vehicles can be quite poor. In particular, $CO_2$ levels are found to be very high in passenger cars as well as in public transportation systems. For example, it was found that in a passenger car with four occupants and no outside air circulation, the $CO_2$ concentration within cabin air of a closed cabin of the car, rises at a rate initially exceeding about 300 parts per million (ppm) per minute. After ten minutes of occupancy within the car, the $CO_2$ concentration within cabin air was found to be higher than 2500 ppm. After thirty minutes of occupancy within the car, the $CO_2$ concentration within the cabin air reached a concentration of about 4000 ppm, dangerously above the recommended $CO_2$ concentration limit of 1000 ppm indoors.

The effects of elevated $CO_2$ are only partly understood but it has been shown that even moderate elevation of $CO_2$ has substantial impact on human cognitive functions, thus not only affecting the comfort and health of the passengers but also potentially diminishing the performance of the driver or operator and thereby creating a potential safety hazard.

The need for $CO_2$ removal in passenger vehicles or public transportation has not been appreciated, let alone effectively addressed, and no practical solution has been proposed until now. This may be due to several reasons. Firstly, the impact of moderately-elevated $CO_2$ on humans is not well understood, and its importance in a vehicle cabin even less so. Secondly, the problem only arises in a well-sealed vehicle with almost complete air recirculation, thus has been easy to overlook. And in addition, $CO_2$ removal is a technically difficult challenge, much more so that simple air filtration, and practical solutions that can be cost effective in commercial vehicles has not been available until now.

SUMMARY OF SOME OF THE EMBODIMENTS

In some embodiments, the current subject matter relates to a system and a method for removing $CO_2$ from indoor air in a vehicle cabin. In some embodiments, the system is compact and light weight, but at the same time operate for extended periods of time with minimal maintenance. In one embodiment, this can be accomplished by sorbents that undergo frequent cycles of regeneration through a temperature-concentration swing adsorption, enabled by performing regeneration in situ.

In some embodiments, a transportation vehicle (e.g., an automobile, bus, train aircraft, and the like) air cleaning system is provided which may be configured to operate in at least an adsorption mode and an in-situ regeneration mode. Such embodiments may include at least one type of sorbent material configured to remove $CO_2$ from cabin air of an automotive vehicle according to a repeated adsorption-desorption swing cycle, a first inlet configured to supply a first airflow of air from the cabin to the system during an adsorption mode, a first outlet configured to return the first airflow after passing over and/or through the sorbent material during the adsorption mode, a second inlet configured to supply a second airflow of outside air to the system during a regeneration mode, a second outlet to exhaust the second airflow after passing over and/or through the sorbent material during the regeneration mode, at least one damper and/or at least one fan, and at least one controller configured to control the first airflow, the second airflow, and cycling between the adsorption mode and the regeneration mode. Control may be carried out via the at least one damper and/or the at least one fan.

In some embodiments, a transportation vehicle air cleaning system is provided which is configured to remove $CO_2$ from air in a cabin of an automotive vehicle. The system may comprise at least one $CO_2$ sensor arranged within an automotive vehicle and configured to generate a signal corresponding to a concentration of $CO_2$ in air of a cabin of the vehicle, a first inlet configured to receive a first airflow from the cabin of the vehicle, a first outlet configured to return the first airflow to the cabin, wherein the first outlet is configured to operate in combination with the first inlet such that at least a portion of the $CO_2$ is separated or otherwise removed from the first airflow, a second outlet configured to exhaust the separated $CO_2$, at least one damper and/or at least one fan, an at least one controller configured to control the first airflow via at least one of the at least one damper and the at least one fan.

Various system embodiments may additionally include one and/or another of the following features:

computer code operational thereon configured to control the first airflow, the second airflow, and cycling between the adsorption mode and the regeneration mode;

the sorbent material is at least one of a solid supported amine, clay, silica, alumina, molecular sieve, metal organic framework, activated carbon, fiber materials, polymers, and carbon particles;

use of a flow of heated outside air when operating in the regeneration mode;

supplying heat to the second airflow from at least one of an engine of the vehicle, mechanical systems of the engine, and fluid systems of the engine;

providing at least one cartridge or subassembly configured to contain the at least one type of sorbent material;

a housing configured to receive the at least one cartridge or subassembly, wherein the at least one cartridge or subassembly is further configured for removal from the housing;

at least one $CO_2$ sensor arranged within the vehicle and configured to generate a cabin $CO_2$ signal corresponding to a concentration of $CO_2$ in the cabin air;

configuring the controller to receive a cabin $CO_2$ signal and control the operative mode of the system according to the concentration of $CO_2$ in the cabin air;

at least one second removal means configured to remove a second substance from the cabin air, the second substance may be one of volatile organic compounds, smoke, nitrous oxide, ozone, sulfur diode, carbon monoxide, molds, fungi, bacteria and viruses;

the second removal means being configured to generate at least one of radiation, ions, plasma, and a molecular species that reacts with and/or eradicates the second substance, and the second removal means can include a catalyst; and the controller is configured to determine an open and/or a closed state of at least one of a door, a window, and a vent of the vehicle, and the controller may additionally be configured to modify the operative mode of the system based on the open and/or closed state.

In some embodiments, a method for cleaning cabin air an automotive vehicle is provided and may comprise receiving a first airflow of air from the cabin of an automotive vehicle, flowing the first airflow over and/or through at least one type of sorbent material configured to remove $CO_2$ from the first airflow during an adsorption mode, returning the first airflow after having been flowed over and/or through the at least one sorbent, receiving a second airflow of outside air from a second inlet, flowing the second airflow over and/or through the at least one type of sorbent material to regenerate the sorbent during a regeneration mode, exhausting the second airflow from a second outlet after having flowed over and/or through the sorbent material during the regeneration mode, an controlling the first airflow, the second airflow, and cycling between the adsorption mode and the regeneration mode via at least one of at least one damper and/or at least one fan.

In some embodiments, a method for cleaning the cabin air of an automotive vehicle is provided and may comprise receiving or otherwise obtaining a signal and/or data of a concentration of $CO_2$ in air of a cabin of the vehicle, receiving a first airflow of cabin air via a first inlet, separating and/or removing at least a portion of the $CO_2$ from the first airflow, exhausting the separated $CO_2$, returning the remainder of the first airflow of cabin air via a first outlet, and controlling the first airflow via at least one of the at least one damper and the at least one fan.

Various method embodiments of the present disclosure may additionally include at least one and/or another of the following features:

the method is implemented via at least one processor having computer code operational thereon configured to control airflows, e.g., at least one of the first airflow, the second airflow, and cycling between the adsorption mode and the regeneration mode (if applicable);

heating the second airflow prior to flowing the second airflow over and/or through the sorbent (if applicable), where heat for heating the second airflow may be supplied from at least one of an engine of the vehicle, mechanical systems of the engine, and fluid systems of the engine;

containing the adsorbent material within at least one cartridge or subassembly, where the at least one cartridge or subassembly may be configured for removable replacement within a housing, the housing configured to receive the first and second airflows;

determining the concentration of $CO_2$ in the cabin air via, for example, at least one $CO_2$ sensor arranged within the vehicle, and/or other such $CO_2$ determining means familiar to one of skill in the art;

changing operative modes according to the concentration of $CO_2$ in the cabin air;

flowing the first airflow over and/or through at least one second removal means configured to remove a second substance from the cabin air, where the second substance is one of volatile organic compounds, smoke, nitrous oxide, ozone, sulfur diode, carbon monoxide, molds, fungi, bacteria and viruses, and where the second removal means may be configured to generate at least one of radiation, ions, plasma, and a molecular species that reacts with and/or eradicates the second substance, and where the second removal means may include a catalyst;

determining an open and/or a closed state of at least one of a door, a window, and a vent of the vehicle; and changing operative mode(s) based on the open and/or closed state of at least one of a door(s), a window(s), and a vent(s) of the vehicle.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The principles and operations of the systems, apparatuses and methods according to some embodiments of the present disclosure may be better understood with reference to the drawings, and the following description. The drawings are given for illustrative purposes only and are not meant to be limiting.

DETAILED DESCRIPTION OF SOME OF THE EMBODIMENTS

Figure 1A:
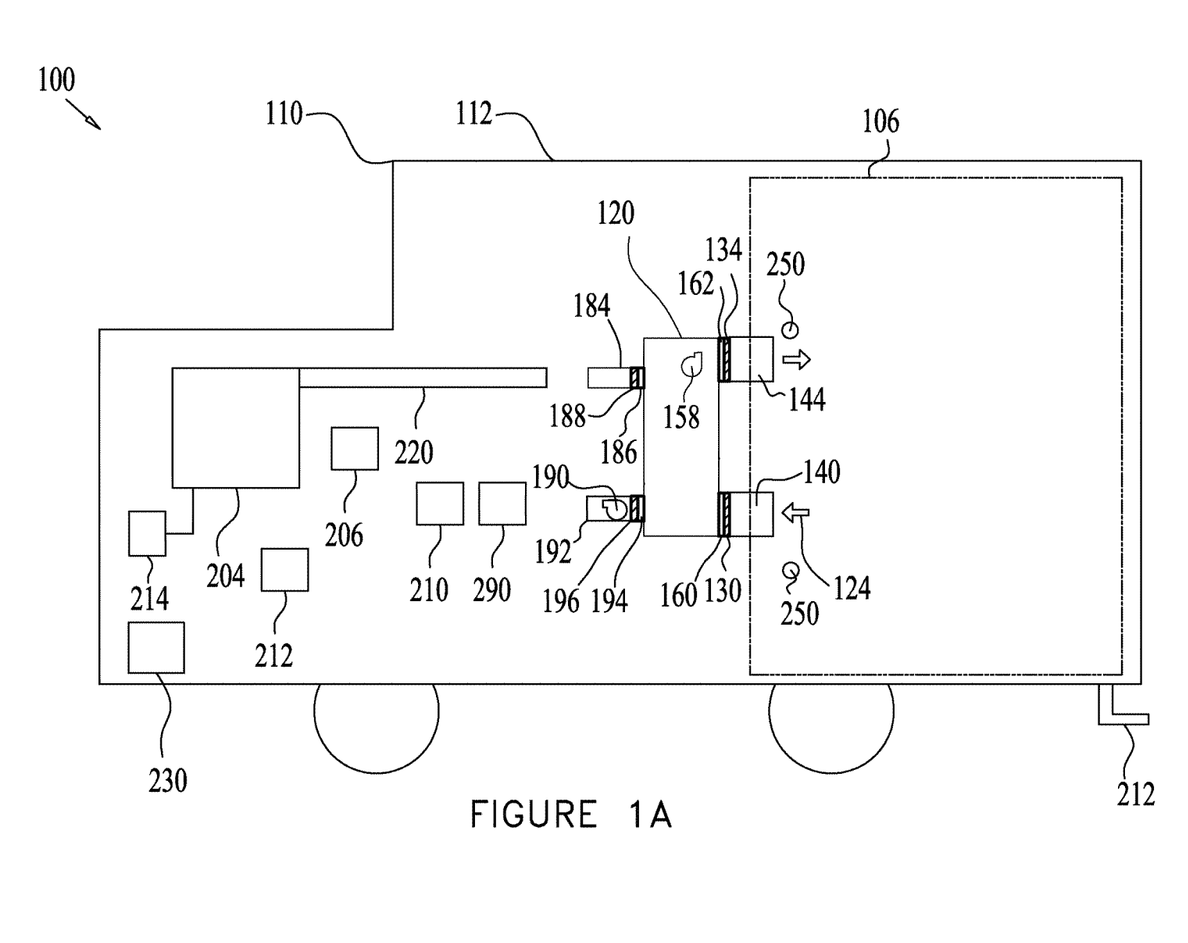
FIGS. 1A and 1B are schematic illustrations of an exemplary vehicle cabin $CO_2$ cleaning system according to some embodiments of the present disclosure, at an adsorption mode (1A) and at a regeneration mode (1B), according to some embodiments of the present disclosure.

FIGS. 1A-2B are schematic illustrations of an exemplary vehicle cabin $CO_2$ cleaning system according to some embodiments of the present disclosure. As seen in FIG. 1A, a vehicle cabin $CO_2$ cleaning system 100 is positioned in airflow contact with a cabin space 106 of an automotive vehicle 110, shown in FIGS. 1A-2B comprising an automobile, such as a passenger car 112.

A scrubber assembly 120 may be provided to reduce the concentration of $CO_2$ contained in cabin air 124 introduced therein from the cabin space 106. The air treatment assembly 120 may be configured with a cabin air inlet 130 for flow of cabin air 124 therein. The inlet 130 may be configured to supply a first airflow of cabin air 124 from the cabin 106 to the air treatment assembly 120 during an adsorption mode. A cabin air outlet 134 may be provided for flow of scrubbed or treated cabin air 124 out of the air treatment assembly 120. The outlet 134 may be configured to return the first airflow after passing over and/or through an adsorbent material during the adsorption mode. In some embodiments, the outlet 134 may be configured to return the cabin air 124 to the cabin space 106. In some embodiments, the outlet 134 may be configured to operate in combination with the inlet 130 such that at least a portion of the $CO_2$ is separated or otherwise removed from the first airflow, including the cabin air 124.

The cabin air 124 flowing through the air treatment assembly 120 may come in contact with the adsorbent materials inside the air treatment assembly 120, and thus $CO_2$ is captured and removed from the cabin air 124. The adsorbent material may also be referred to as a "sorbent material". A granular or solid sorbent is configured in one or more fixed, permeable beds, where the air is directed to flow through the bed so as to achieve effective contact with the sorbent particles. In some embodiments, an important property of a suitable sorbent is not only its ability to capture $CO_2$ selectively from the air stream, but also repeatedly to release the captured $CO_2$ under practically achievable temperature and flow conditions so as to enable in-situ regeneration for continued long term operation according to a repeated adsorption-desorption swing cycle. An exemplary suitable $CO_2$ adsorbent material may be a granular adsorbent particles or solid support material supporting an amine-based compound, such as disclosed in applicant's PCT application PCT/US12/38343.

Figure 1B:
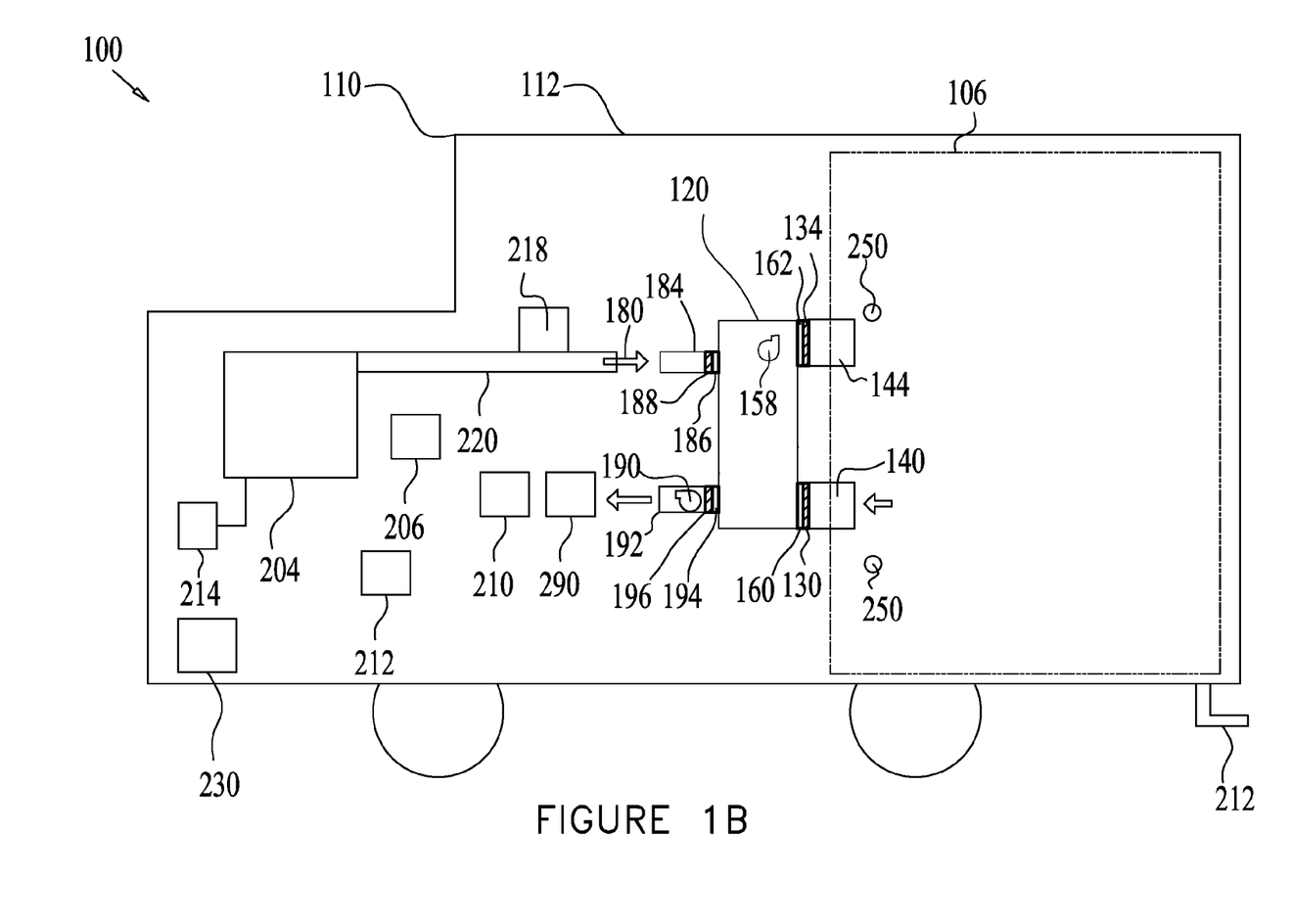
Figure 2A:
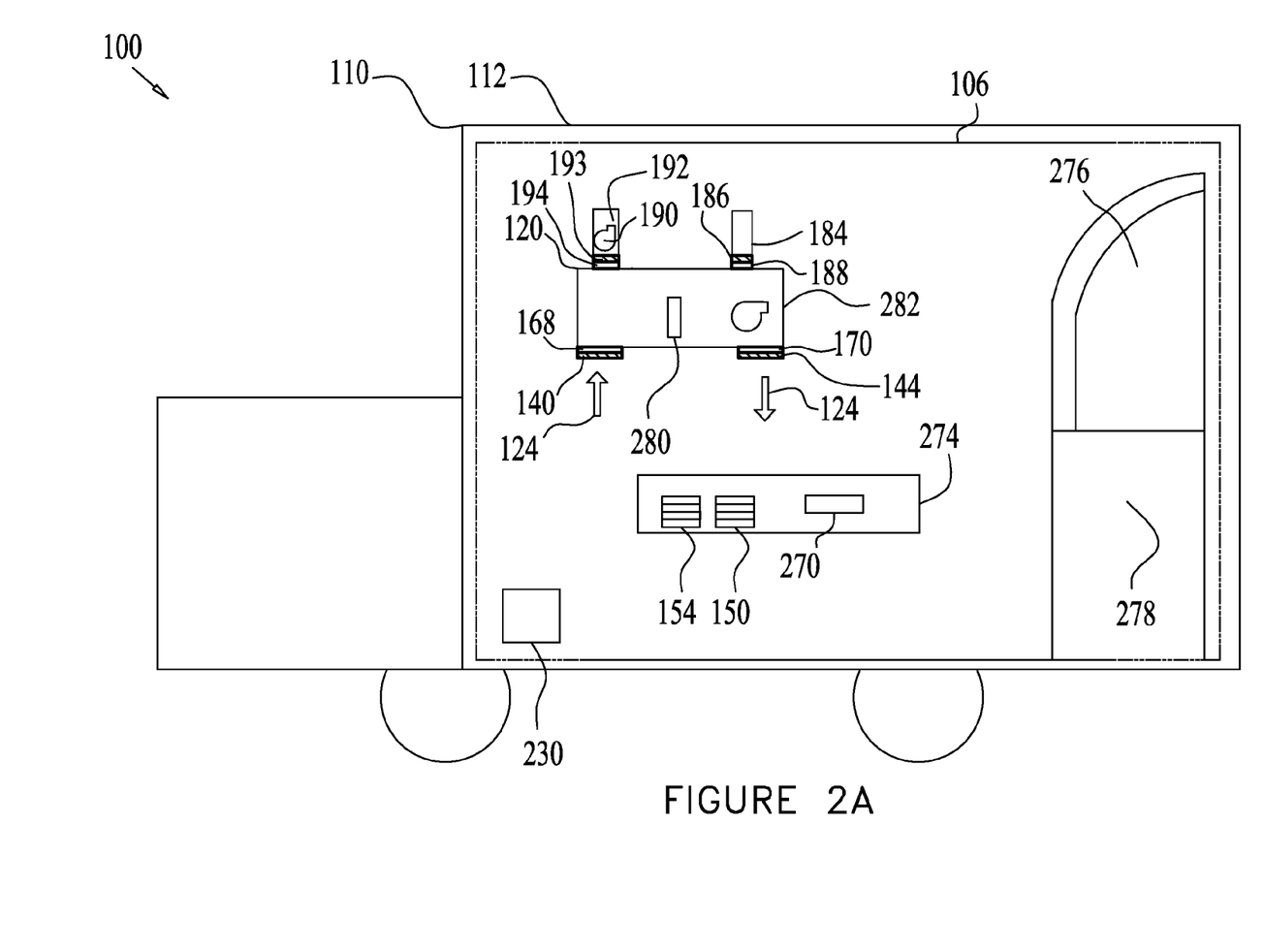
FIGS. 2A and 2B are schematic illustrations of an exemplary vehicle cabin $CO_2$ cleaning system according to some embodiments of the present disclosure, at an adsorption mode (2A) and at a regeneration mode (2B), according to some embodiments of the present disclosure.
Figure 2B:
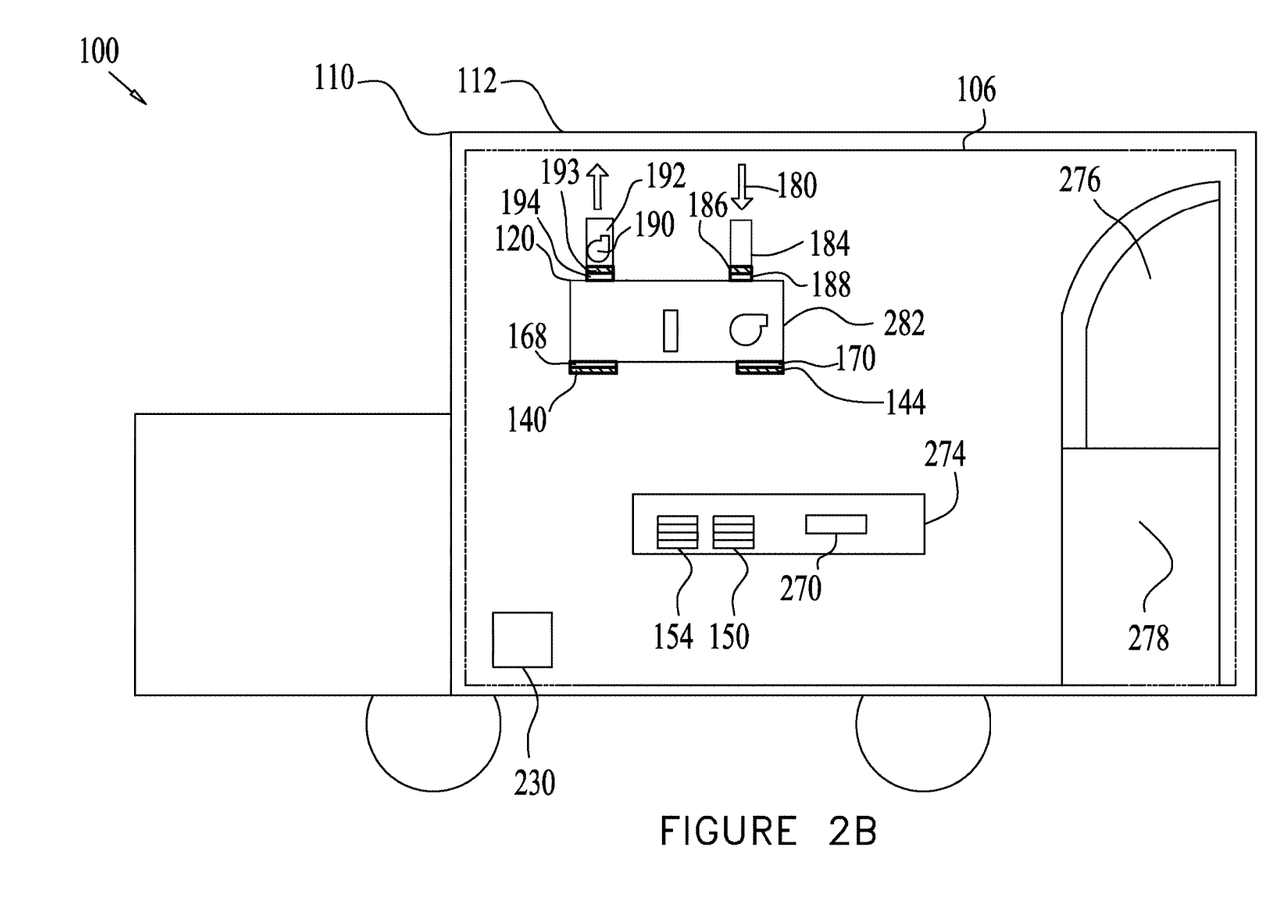

In some embodiments, the cabin air 124 may enter from the cabin 106 into the cabin air inlet 130, via an entry conduit 140, such as when the air treatment assembly 120 is placed out of or in close proximity to the cabin 106, as shown in FIGS. 1A and 1B. The cabin air 124 may exit outlet 134 via an exit conduit 144 back into the cabin space 106. In some embodiment, the cabin air 124 may enter cabin air inlet 130 directly from the cabin space 106 or from a vehicle air vent 150 within the cabin space 106, such as when the air treatment assembly 120 is placed in the cabin space 106, as shown in FIGS. 2A and 2B. The cabin air 124 may exit outlet 134 directly back into the cabin space 106 or from a vehicle air vent 154 within the cabin space 106. In this way the cabin air 124 may circulate from the cabin space 106 to the air treatment assembly 120 and flow therethrough to contact the adsorbent material. Following capture and removal of the $CO_2$ from the circulating cabin air 124, the scrubbed cabin air 124 may enter the cabin 106 for further circulation thereof.

In some embodiments, the volume of the cabin air 124 flowing into the air treatment assembly 120 may be controlled by a scrubber fan 158 and/or a scrubber entry damper 160 and/or a scrubber exit damper 162 or by any other suitable means.

As described above, when the cabin space 106 is closed and substantially sealed from outside air entry, ensuring a safe concentration level of $CO_2$ within the cabin space 106 can be provided by continual scrubbing of $CO_2$ from the cabin air by the adsorbent material.

Adsorbent materials may become saturated once the amount of $CO_2$ captured reaches a certain percentage of the adsorbent material weight. The saturation capacity depends on chemistry, temperature and $CO_2$ concentration in the air. In some embodiments, this percentage may be between about 1% to 4%. In some embodiments this percentage may be between about 4% to 10%. A human typically exhales between approximately 25-50 grams of $CO_2$ per hour, so in some embodiments 1 kilogram of sorbent can provide scrubbing capacity required for a single passenger for approximately one hour. In some embodiments, increasing the amount of sorbent may not be desirable, as this adds weight, cost and requires physical space. An alternative solution is regeneration of the adsorbent material, namely desorption and exhaust of the captured $CO_2$, after which the adsorbent material can resume adsorption.

In some embodiments, it is important for extended operation to perform in-situ regeneration of the adsorbent material, without removal therefrom from the air treatment assembly 120. Regeneration releases at least a portion of the $CO_2$ captured by the adsorbent material. Thus, a limited amount of adsorbent material may be used repeatedly, to scrub the cabin air 124 during an extended period of sealed operation and occupancy of passengers within the vehicle 110. Additionally, the air treatment assembly 120 has a significantly long operating life.

The regeneration may be performed in any suitable manner. As shown in FIG. 1B, in some embodiments, regeneration may be performed by streaming a purge gas over and/or through the adsorbent material for release of at least a portion of the $CO_2$ therefrom.

In accordance with some embodiments, the purge gas comprises outside air 180 from the outside environment out of the vehicle 110. In some embodiments, the outside air is heated so as to accelerate the removal of the $CO_2$ from the adsorbent material.

In some embodiments, during regeneration, the purging outside air 180 may flow into the air treatment assembly 120, via an entry conduit 184, and a purge entry damper 186, when positioned in an open state. In some embodiments, the entry conduit 184 may comprise an inlet 188 configured to supply a second airflow comprising outside air 180 to the air treatment assembly 120 during the regeneration mode. A purge fan 190 may be provided for urging flow of the purging outside air 180 within the air treatment assembly 120. The purge fan 190 may be placed in any suitable location, such as in an exit conduit 192. Alternatively, the purge fan 190 may be omitted or may be the scrubber fan 158 itself, namely one fan supporting both functions of scrubbing and regeneration. The exit conduit 192 may include a purge exit damper 194. The purging outside air 180 along with the $CO_2$ may exit the air treatment assembly 120 via exit conduit 192 to be exhausted to the outside of the vehicle 112. In some embodiments, the exit conduit 192 may comprise an outlet 196 for returning the outside air 180 after passing over and/or through the adsorbent material during the regeneration mode.

As shown in FIG. 1B, in some embodiments, the purging outside air 180 may flow during regeneration in the opposite direction of the cabin air 124, such as from entry conduit 184 to the exit conduit 192. Alternatively, the purging outside air 180 may flow during regeneration in the same direction of the cabin air 124, such as from exit conduit 192 to entry conduit 184.

In some embodiments, during regeneration, the purge entry damper 186 and purge exit damper 194 may be at least partially open while the scrubber entry damper 160 and scrubber exit damper 162 are closed, sealing the cabin air 124 from the air treatment assembly 120.

Similarly, during the adsorption mode, the scrubber entry damper 160 and scrubber exit damper 162 may be at least partially open, while purge entry damper 186 and purge exit damper 194 are closed.

It is noted that the entry conduit 184 may be replaced by an aperture allowing the purging outside air 180 to flow into the air treatment assembly 120. The exit conduit 192 may be replaced by any exhaust port allowing the purging outside air 180 to flow out of the air treatment assembly 120.

The assembly may be located within the vehicle body of the vehicle 110 yet outside the cabin space 106, for example under the front hood of the passenger car 112, or in any other suitable space. In such an embodiment, the ambient air around the air treatment assembly 120 assembly may be outside air, not cabin air 124.

In some embodiments, the purging outside air 180 is heated so as to accelerate the removal of the $CO_2$ from the adsorbent material. The purging outside air 180 may be heated in any suitable manner, such as by direct or indirect use of heat or power from an engine 204 of the passenger car 112 or by an automotive heating system of the passenger car 112. This may include heat from a radiator 206, or exhaust heat of an exhaust system 210. It may also include heat from a fluid coil or an evaporator 212, for example. This may include heat from mechanical or fluid systems 214 attached to or associated with the engine 204. In some embodiments, heat may be transferred to the purging outside air 180 by means of a heat exchange element 218. A conduit 220 may be provided to direct heated outside air 180 from the heat source or the heat exchanger to the entry conduit 184.

In some embodiments, the purging outside air 180 may be treated by means of filters or heated prior to flowing into the air treatment assembly 120.

In some embodiments, the air treatment assembly 120 may be operated automatically by a controller or controller system 230, or may be operated manually or by a combination of automatic and manual operation. The controller 230 may be configured to control the first airflow, comprising the cabin air 124, the second airflow, comprising the outside air 180, and cycling between the adsorption mode and the regeneration mode, via at least one of the dampers and/or at least one of the fans. The controller system 230 may control the operation of electrical or mechanical components of the vehicle cabin cleaning system 100, such as the fan and/or dampers. Accordingly, the controller system 230 may control the operation of the adsorption mode and regeneration mode and switching therebetween, as well as the duration or other parameters thereof. Additionally for example, the controller system 230 may control the volume of the cabin air 124 or the purging outside air 180 entering the air treatment assembly 120.

In some embodiments, sensors may be provided to detect properties of the cabin air 124, such as a $CO_2$ sensor 250. The $CO_2$ sensor 250 may be arranged within the cabin space 106 of the passenger car 112, such as near the cabin air inlet 130 and/or cabin air outlet 134 or any suitable location for detecting the $CO_2$ concentration within the cabin air 124 before and/or after scrubbing thereof in the air treatment assembly 120. The sensor 250 may be configured to generate a signal corresponding to a $CO_2$ concentration within the cabin air 124 and transmit the signal to the controller system 230. The controller system 230 may, according to the received signal, activate the air treatment assembly 120. For example, the controller system 230 may be configured to receive the cabin $CO_2$ signal and control the operative mode of the system 100 according to the concentration of $CO_2$ in the cabin air 124.

In some embodiments, the $CO_2$ concentration of the cabin air 124 may be provided to the passenger or may be transmitted to a suitable database. For example, the $CO_2$ concentration level may be displayed on a display 270 (FIG. 2A). The display 270 may be located on a dashboard 274 or on a vehicle multimedia display system or navigation system, for example. In some embodiments, the passenger, upon reading the $CO_2$ concentration level, may accordingly elect to activate or de-activate the adsorption mode.

In some embodiments, the controller system 230 may be configured to activate a scrubber standby mode of shutoff mode. In some embodiments, this mode may be activated upon opening of a window 276, or a door 278 or flow of outside ventilation air in the cabin space 106. The controller system 230 may be configured to determine an open and/or a closed state of the window 276, or a door 278 or vents 150 or 154 of the passenger car 112 and accordingly modify the operative mode of the air treatment assembly 120 based on the open and/or closed state.

It is noted that in addition or in place of the dampers and fans of FIGS. 1A-2B, other components such as valves, fans, blowers, or shutters, may be used to control the volume of air entering and/or exiting the air treatment assembly 120 and any components may be used for directing the cabin air 124 and purging outside air 180 into the air treatment assembly 120.

In some embodiments of the disclosure, the $CO_2$ adsorbent material may be an important enabler. In some embodiments, the $CO_2$ adsorbent materials may include, but are not limited to, granular adsorbent particles or clay-based adsorbents, alkaline salts, carbon, carbon particles activated carbon, zeolites, natural zeolite, activated charcoal, molecular sieves, silica, silica gel, porous silica, alumina, porous alumina, titanium oxide, fiber materials, carbon fibers, polymers, porous polymers, polymer fibers and metal organic frameworks. In some embodiments, the $CO_2$ scrubbing may be performed by sheet sorbents, including fiber, cellulose, polymer, and other paper or cloth based sorbents. In some embodiments, the $CO_2$ scrubbing may be performed by electro-adsorbent means for adsorbing the $CO_2$.

In some embodiments, the $CO_2$ adsorbent materials may be configured as a granular solid contained in one or more removable subassemblies or cartridges 280 with permeable surfaces for allowing the cabin air 124 and purging outside air 180 to flow therethrough, each cartridge 280 effectively creating what is known in the art as a fixed sorbent bed. The cartridge 280 may be configured in any suitable shape that provides a desirable bed depth (the dimension of the adsorbent material in the direction of flow of the cabin air 124 or purging outside air 180) and cross sectional area. The cartridge 280 can be a flat structure with a rectangular footprint or any other geometry. In some embodiments, the cartridge 280 may be formed of a hollow cylinder or substantially similar structure allowing air to flow radially through adsorbent-containing cylinder walls. The $CO_2$ adsorbent material may be configured and contained in any suitable manner. In some embodiments the sorbent is formed or molded into shaped, permeable solids that allow air to flow therethrough. In some embodiments, the air treatment assembly 120 may comprise a housing 282 configured to receive at least one cartridge 280, wherein the at least one cartridge 280 may be further configured for removal thereof from the housing 280.

In some embodiments, the absorbent material may require periodic replacements. The $CO_2$ cartridges 280 may be configured to be easily removed from the assembly 120 and be replaced periodically as needed, without having to remove or disassemble the entire the air treatment assembly 120.

The air treatment assembly 120 may be configured with two or more scrubbing units, or chambers, with separate air inlets and outlets, such as cabin air inlets 130 and outlets 134 and inlets 188 and outlets 196 for each chamber. This allows one chamber to operate in the adsorption mode while the other(s) are undergoing regeneration, thus enabling continuous cabin air treatment, substantially without interruption.

In some embodiments, the scrubber may operate on a principle other than temperature swing adsorption. In some embodiments, scrubbing $CO_2$ can be achieved by utilizing passive or electro-active membranes that are selectively permeable to carbon dioxide, allowing the $CO_2$ to escape from the cabin air 124 through the membrane. In some embodiments, electrochemical separation of $CO_2$ can be used to continually remove $CO_2$ from the air stream entering the assembly 120. In some embodiments, the cartridge 280 or subassembly may be configured to contain the membrane.

In some embodiments, the system 100 may be configured to reduce the concentration of other contaminates, such as Volatile Organic Compounds (VOC), ozone, nitrous oxides, sulfur oxides, carbon monoxide, additional gases and vapors, as well as particles, microorganisms, bacteria, viruses, molds, fungi, fumes, smoke and dust, which may further affect cabin air quality.

The vehicle cabin air cleaning system 100 may comprise additional air treatment elements, to perform other types of cleansing or air treatment functions. Examples may include passive particle filter, electrostatic particle filters, catalysts or adsorbents for removing certain unwanted compounds (like the VOCs, carbon monoxide, ozone, nitrous oxides, sulfur oxides, and other gases), ultraviolet sources for sterilization or for catalyzing unwanted compounds, plasma sources, ion generators or catalysts that produce a cleansing agent, such as ozone or hydrogen peroxide vapor. In some embodiments, the additional air treatment elements or removal means may be configured to generate at least one of radiation, ions, plasma, and a molecular species that reacts with the other contaminates or substance.

The vehicle 110 may comprise any vehicle or vessel provided for transportation of people. Non-limiting examples for a vehicle 110 may include an automobile, a bus, a van, a cab, a train, a passenger train, an air craft, a passenger aircraft, a ship or a sea vessel of any kind and/or other partially and/or fully enclosed transient structure which can be at times occupied by equipment, materials, live occupants (e.g., humans, animals, synthetic organisms, etc.), and/or any combination thereof.

In some embodiments, the air treatment assembly 120 may be placed in fluid communication with an air flow path, such as ventilation ducts that circulate cabin air 124 between the cabin space 106 and a vehicle's air conditioning and ventilation system 290. In some embodiments the air treatment assembly 120 may intercept a portion of the circulating cabin air 124 from the ventilation ducts, so that the scrubbed cabin air 124 is conditioned before returning to the cabin space 106.

In some embodiments, the adsorbent material may be heated during the regeneration mode and thus may be cooled down prior to the commencement of an adsorption mode so as to avoid unnecessary heating of the circulating cabin air 124. Accordingly, the air treatment assembly 120 may be activated in a "cool down" mode. In this mode the scrubber entry damper 160 and scrubber exit damper 162 may remain closed and the adsorbent material may be flushed with cool air. The cool air can be simply unheated outside air or, alternatively, air that has been cooled or conditioned by the vehicles air conditioning system 290.

In some embodiments, the controller 230 may include computer code operational thereon configured to control the first airflow, comprising cabin air 124 the second airflow comprising the outside air 180, and cycling between the adsorption mode and the regeneration mode. In some embodiments, the controller 230 may include computer code operational thereon configured to control the first airflow, comprising cabin air 124.

Various implementations of some of the embodiments disclosed, in particular at least some of the processes discussed (or portions thereof), may be realized in digital electronic circuitry, integrated circuitry, specially configured ASICs (application specific integrated circuits), computer hardware, firmware, software, and/or combinations thereof. These various implementations, such as associated with the controller 230, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) or OLED (organic light emitting diode) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smartphone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

The components of the system may be interconnected by any form or medium of digital data communication (e.g., a communication network). Examples of communication networks include a local area network ("LAN"), a wide area network ("WAN"), and the Internet. The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented in the present application, are herein incorporated by reference in their entirety.

Example embodiments of the devices, systems and methods have been described herein. As noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements from any other disclosed methods, systems, and devices, including any and all elements corresponding to vehicular air cleaning systems. In other words, elements from one or another disclosed embodiments may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain one or more negative limitations to specifically exclude one or more elements/features resulting in embodiments which are patentably distinct from the prior art which include such features/elements.

What is currently claimed is:

1. A automotive vehicle air cleaning system configured to operate in at least an adsorption mode and an in-situ regeneration mode, comprising:
   at least one type of sorbent material configured to remove $CO_2$ from cabin air of an automotive vehicle according to a repeated adsorption-desorption swing cycle;
   a first inlet configured to supply a first airflow of air from the cabin to the system during an adsorption mode;
   a first outlet configured to return the first airflow after passing over and/or through the sorbent material during the adsorption mode;
   a second inlet configured to supply a second airflow of outside air to the system during a regeneration mode;
   a second outlet to exhaust the second airflow after passing over and/or through the sorbent material during the regeneration mode;
   at least one damper and/or at least one fan; and
   at least one controller configured to:
   control the first airflow, the second airflow, and cycling between the adsorption mode, the regeneration mode via the at least one damper and/or the at least one fan,
   determine a state of the vehicle including one or more of: whether a window of the vehicle is open or closed, whether a door of the vehicle is open or closed, and whether a vent of the vehicle is open or closed; and
   control a standby or shutoff mode based on the state of the vehicle via the at least one damper and/or the at least one fan.

2. The system of claim 1, wherein the controller includes computer code operational thereon configured to control the first airflow, the second airflow, and cycling between the adsorption mode and the regeneration mode.

3. The system of claim 1, wherein the system is configured to supply heat to the second airflow from at least one of an engine of the vehicle, mechanical systems of the engine, fluid systems of the engine, heat originating from the engine and heat of the mechanical systems or fluid systems attached to the engine.

4. The system of claim 1, further comprising at least one cartridge or subassembly configured to contain the at least one type of sorbent material.

5. The system of claim 4, further comprising a housing configured to receive the at least one cartridge or subassembly, wherein the at least one cartridge or subassembly is further configured for removal from the housing.

6. The system of claim 1, further comprising at least one $CO_2$ sensor arranged within the vehicle and configured to generate a cabin $CO_2$ signal corresponding to a concentration of $CO_2$ in the cabin air.

7. The system of claim 6, wherein the controller is configured to receive the cabin $CO_2$ signal and control the operative mode of the system according to the concentration of $CO_2$ in the cabin air.

8. The system of claim 1, further comprising at least one second removal means configured to remove a second substance from the cabin air, wherein the second substance is one of volatile organic compounds, smoke, nitrous oxide, ozone, sulfur diode, carbon monoxide, molds, fungi, bacteria and viruses.

9. A method for cleaning cabin air of an automotive vehicle, comprising:
   receiving a first airflow of air from a cabin of an automotive vehicle;
   flowing the first airflow over and/or through at least one type of sorbent material configured to remove $CO_2$ from the first airflow during an adsorption mode;
   returning the first airflow after having been flowed over and/or through the at least one sorbent material;
   receiving a second airflow of outside air from a second inlet;
   flowing the second airflow over and/or through the at least one type of sorbent material to regenerate the sorbent material during a regeneration mode;

exhausting the second airflow from a second outlet after having flowed over and/or through the sorbent material during the regeneration mode;

determining a state of the vehicle including one or more of:
whether a window of the vehicle is open or closed, whether a door of the vehicle is open or closed, and whether a vent of the vehicle is open or closed;

controlling the first airflow, the second airflow, and cycling between the adsorption mode and the regeneration mode via at least one of at least one damper and/or at least one fan; and controlling a standby or shutoff mode via the at least one of at least one damper and/or at least one fan based on the state of the vehicle.

10. The method of claim 9, wherein the method is implemented via at least one processor having computer code operational thereon configured to control the first airflow, the second airflow, and cycling between the adsorption mode and the regeneration mode.

11. The method of claim 9, wherein heat for heating the second airflow is supplied from at least one of an engine of the vehicle, mechanical systems of the engine, fluid systems of the engine, heat originating from the engine and heat of the mechanical systems or fluid systems attached to the engine.

12. The method of claim 9, further comprising containing the adsorbent material within at least one cartridge or subassembly.

13. The method of claim 12, further comprising configuring the at least one cartridge or subassembly for removable replacement within a housing, the housing configured to receive the first and second airflows.

14. The method of claim 9, further comprising determining a concentration of the $CO_2$ in the cabin air via at least one $CO_2$ sensor arranged within the vehicle.

15. The method of claim 14, further comprising changing operative modes according to the concentration of $CO_2$ in the cabin air.

16. The method of claim 9, further comprising flowing the first airflow over and/or through at least one second removal means configured to remove a second substance from the cabin air, wherein the second removal substance is one of a volatile organic compound, smoke, nitrous oxide, ozone, sulfur diode, carbon monoxide, molds, fungi, bacteria and viruses.

17. The method of claim 16, wherein the second removal means is configured to generate at least one of radiation, ions, plasma, and a molecular species that reacts with and/or eradicates the second substance.

18. The method of claim 16, wherein the second removal means includes a catalyst.

19. The method of claim 9, further comprising changing the operative mode based on the open and/or closed state.

* * * * *